3,243,385
PROCESS FOR THE MANUFACTURE OF A CATALYST CONTAINING VANADIUM AND TIN OXIDES

Kurt Sennewald and Wilhelm Vogt, Knapsack, near Cologne, and Alexander Ohorodnik, Liblar, Germany, assignors to Knapsack-Griesheim Aktiengesellschaft, Knapsack, near Cologne, Germany, a corporation of Germany
No Drawing. Filed Aug. 10, 1964, Ser. No. 388,721
Claims priority, application Germany, Sept. 19, 1963, K 50,865
17 Claims. (Cl. 252—437)

The present invention is concerned with a process for the manufacture of a catalyst containing vanadium and tin oxides.

Oxidic catalysts containing vanadium, tin and optionally phosphorus as well as a still further metal and deposited on a carrier material have already been described and proposed for use in the manufacture of unsaturated nitriles by oxidizing olefins having 3 or 4 carbon atoms with air and/or oxygen in the presence of ammonia and optionally steam. The same catalysts can also be used for making nitriles by oxidizing methylbenzenes in the gaseous phase with air and/or oxygen in the presence of ammonia and optionally steam, and for making nitriles by oxidizing saturated aliphatic aldehydes, ketones or fatty acid esters in the presence of ammonia and optionally steam.

These catalysts have previously been prepared by dissolving metallic tin in concentrated e.g. 68% nitric acid with the formation of a partially colloidal suspension of tin dioxide.

The present invention is based on the unexpected observation that considerably improved conversion rates and yields can be obtained in the above reactions catalyzed by a vanadium-tin-catalyst with the proviso that the catalyst is prepared by dissolving metallic tin in approximately semi-concentrated nitric acid at a temperature not exceeding 20° C. so as to obtain a clear solution of tin-II-nitrate. In addition thereto, the finished catalyst is required to have a specific surface area of 50 to 500 m.$^2$/g., preferably of 300 to 400 m.$^2$/gram.

The vanadium-tin catalysts customarily used have a specific surface area of at least 700 m.$^2$/g. after calcination. As taught by Gmelin, "Handbuch der anorg. Chemie," 8th edition, system No. 15, part B, pages 501 et seq., the specific surface area can be decreased to about 400 m.$^2$/g. by treating the mixed, homogenized and moist catalyst in the liquid phase with aqueous ammonia. In order to further reduce the specific surface area to about 50 to 400 m.$^2$/g., the finished calcined catalyst which is preferably kept in motion is treated according to this invention for several hours at an elevated temperature with steam and gaseous ammonia (ratio by volume: 1:1 to 1:5), optionally in admixture with air.

Apart from the specific surface area, the porosity of the catalyst is of some importance. In view of the fact, however, that porosity and specific surface area are in reciprocal relationship, the nature of a catalyst deposited on a silicic acid carrier can be defined by its specific surface area alone.

The specific surface area is determined in conventional manner by the BET-method (cf. Journal of Amer. Chem. Soc. 60, 309 (1938)).

Catalysts having a specific surface area of 500 m.$^2$/g. and more have an increased tendency to form by-products, whilst catalysts which have a specific surface area smaller than 50 m.$^2$/g. give too small conversion rates.

The improved catalyst prepared by the process of the present invention gives propylene conversion rates as high as 95 to 99%, acrylonitrile being obtained in yields of 60 to 65%, calculated on the conversion.

The present invention is more especially concerned with a process for the manufacture of a catalyst containing vanadium and tin oxides, wherein tin is dissolved in an about 10 to 40% by weight, preferably about 20 to 30% by weight, aqueous nitric acid at a temperature not exceeding 20° C., the resulting clear solution of tin-II-nitrate is introduced at once into an aqueous, colloidal silicic acid solution containing 8 to 20% by weight, preferably 1 hour, then dried, e.g. by being atomized, calcined vanadate (NH$_4$VO$_3$) and optionally phosphoric acid (H$_3$PO$_4$), the resulting suspension is homogenized fairly rapidly, treated in the liquid phase and in conventional manner with aqueous ammonia at a temperature of 80 to 95° C. for a period of time of 0.5 to 10 hours, preferably 1 hour, then dried e.g. by being atomized, calcined at a temperature of 400 to 800° C., preferably 500 to 650° C., and the calcined catalyst is ultimately treated, at a temperature of 110 to 500° C. and for a period of 1 to 50 hours, preferably 5 to 10 hours, with steam and gaseous ammonia, optionally in admixture with air.

Preferably, about 4.5 to 10 gram atoms tin and 0 to 5, preferably 1 to 3, gram atoms phosphorus in the form of sirupy phosphoric acid are used per gram atom vanadium, which is present as ammonium vanadate.

Per gram atom vanadium used in the form of ammonium vanadate, there may also be used as additional catalyst components 1 to 2 gram atoms of at least one of the elements comprising barium, aluminum, titanium, tungsten, antimony, chromium, and lead, the elements being used in salt form, preferably in the form of a nitrate or acetate.

Speaking generally, the finished catalyst contains about 50 to 90% by weight SiO$_2$ serving as the carrier.

The specific surface area of the catalyst according to this invention is situated between 50 to 500, preferably 300 to 400 m.$^2$/gram.

The starting material used for making the catalyst is silicon dioxide (SiO$_2$) of high purity and having a Na-content of smaller than 0.05% and a potassium content of smaller than 0.01%, the silicon dioxide being prepared from water glass.

The following examples serve to illustrate the process of the present invention:

EXAMPLE 1

*Conventional catalyst preparation*

868 grams tin (7.325 gram atoms) in finely divided form (granulated, chips or powder) were dissolved at a temperature of about 80° C. in 2900 grams 65% nitric acid. The resulting, partially colloidal suspension of tin dioxide was introduced, while stirring, into 62 kg. of a 14% aqueous solution of colloidal silicic acid (144.8 gram atoms Si in the form of SiO$_2$) containing 143.5 grams dissolved ammonium vanadate (NH$_4$VO$_3$; 0.902 gram atom vanadium) and 82 cc. 85% phosphoric acid (H$_3$PO$_4$; density: 1.714; 1.433 gram atoms phosphorus). The suspension so prepared was then stirred with aqueous ammonia at a temperature of about 90° C. and for a period of time of about 0.5 to 10 hours. Ammonia was used in a proportion sufficient to neutralize the phosphoric acid and to leave a slight excess of ammonia.

The moist catalyst could be directly sprayed in an atomization drying means to yield a catalyst having the desired grain size, or the whole mass could be evaporated and the dry material be comminuted to be suitable for ultimate use. The dried and comminuted catalyst was then calcined for 24 hours at 600° C. Depending on the treatment time, the catalyst had a specific surface area of 700 to about 400 m.$^2$/gram. These types of catalysts were used in the experiments described in Examples 3 to 6 below.

In order to prove that the full effect realized by the present invention would not be obtained solely by further diminishing the specific surface area of the above catalyst prepared in conventional manner, a catalyst fraction having a specific surface area of about 400 square meters per gram was treated as taught in this invention at about 400° C. and for a period of time of 1 to 10 hours in a fluidized bed with a mixture consisting of steam and gaseous ammonia (ratio by volume: 1:1 to 1:5).

Depending on the treatment time, the resulting catalyst had a specific surface area of about 50 to 390 m.²/gram, and was used in Examples 7 and 8 below. The specific surface area was determined by the BET-method.

The catalyst had the following composition: $V_2O_5$: 0.82% by weight; $SnO_2$: 11.08% by weight; $P_2O_5$: 1.02% by weight; $SiO_2$: 87.08% by weight.

In the catalyst, the individual elements appeared in the atomic ratio V:Sn:P:Si=1:8.12:1.59:160.6.

EXAMPLE 2

*Preparation of catalyst according to invention*

868 grams finely divided tin (granulated, chips or powder) were dissolved at a temperature not exceeding 20° C. in 6200 grams 30% nitric acid. The resulting clear solution of tin-II-nitrate was introduced at once, while stirring, into 54 kg. of a 16% aqueous solution of colloidal silicic acid (144 gram atoms Si in the form of $SiO_2$) containing 143.5 grams dissolved ammonium vanadate and 82 cc. 85% phosphoric acid. The resulting suspension was homogenized fairly rapidly, e.g. in a colloid mill, and stirred with aqueous ammonia at a temperature of about 90° C. for a period of about 1 hour. The ammonia was used in a quantity sufficient to ensure neutralization of the phosphoric acid and to leave a slight ammonia excess. The catalyst was then dried as described in Example 1, calcined and the calcined catalyst was treated at 400° C. for a period of time of 1 to 10 hours in a fluidized bed with a mixture consisting of steam and gaseous ammonia (ratio by volume 1:1 to 1:5).

During this time, catalyst samples were repeatedly taken, the specific surface area thereof was determined by the BET-method, and the catalysts were used in the experiments described in Examples 10 to 12. The calcined catalyst used in Example 9 had not been subjected to the steam/ammonia gas treatment.

The catalyst had the following composition: $V_2O_5$: 0.825 by weight; $SnO_2$: 11.12% by weight; $P_2O_5$: 1.025% by weight; $SiO_2$: 87.03% by weight.

The single elements appeared in the catalyst in the atomic ratio of V:Sn:P:Si=1:8.12:1.59:159.7.

WORKING EXAMPLES 3 TO 12

1 to 3 liters each of a catalyst prepared in the manner set forth in Examples 1 and 2 having a grain size of 0.06 to 0.1 mm. were used in a heated fluidized bed reactor 5 meters long and 5 cm. wide. At a reaction temperature of 520 to 540° C., 10 moles propylene, 10.1 mols ammonia, 15 mols steam and 100 mols air were caused to flow per hour into the reactor through a preheater. The velocity of flow in the reactor was 100 to 120 cm./second and the time of residence 4 to 5 seconds. To determine the propylene conversion rate and the yield, acrylonitrile, hydrogen cyanide and acetonitrile were removed from the issuing gas by scrubbing it in conventional manner with 2 N-sulfuric acid, distilled from the sulfuric acid solution, and the crude acrylonitrile was analyzed by customary analytical methods. The off-gas coming from the sulfuric acid scrubbing stage which generally contained some residual portions of unreacted propylene and the decomposition products hereof, which include carbon monoxide and carbon dioxide, was subjected to gas chromatography to determine its constituents. The properties of the catalyst were modified as follows as a function of the specific surface area.

| Example | Catalyst of Example | Specific surface area of catalyst, sq. m./gram | Propylene conversion rate, percent | Percent yield in— | | |
|---|---|---|---|---|---|---|
| | | | | Acrylonitrile | HCN | Acetonitrile [1] |
| 3 | 1 | 700 | 95 | 25 | 8 | 12 |
| 4 | 1 | 600 | 95 | 33 | 10 | 8 |
| 5 | 1 | 500 | 94 | 40 | 15 | 4 |
| 6 | 1 | 400 | 94 | 45 | 12 | 2 |
| 7 | 1 | 350 | 95 | 58 | 10 | 1.5 |
| 8 | 1 | 50 | 94 | 55 | 10 | 1.5 |
| 9 | 2 | 500 | 98.5 | 57 | 9 | 3 |
| 10 | 2 | 400 | 97 | 60 | 10 | 1.2 |
| 11 | 2 | 370 | 98 | 62 | 10.9 | 1 |
| 12 | 2 | 350 | 95 | 65 | 10 | 1 |

[1] The yields are referred to the propylene carbon transformed, on the basic assumption that 1 mol acrylonitrile or 3 mols HCN can be obtained from 1 mol propylene, or 3 mols acetonitrile can be obtained from 2 mols propylene.

We claim:
1. A process for the manufacture of a catalyst containing vanadium and tin oxides, which comprises dissolving tin in an about 10 to 40% by weight aqueous nitric acid at a temperature not exceeding 20° C., introducing immediately the resulting clear solution of tin-II-nitrate into an aqueous colloidal silicic acid solution containing 8 to 20% by weight $SiO_2$ and ammonium vanadate ($NH_4VO_3$), homogenizing fairly rapidly the resulting suspension, treating the said suspension in the liquid phase at a temperature of 80 to 95° C. and for a period of time of 0.5 to 10 hours with aqueous ammonia, drying the homogenized suspension, calcining it at a temperature of 400 to 800° C. with the resulting formation of a calcined catalyst, and treating the calcined catalyst at a temperature of 110 to 500° C. for a period of time of 1 to 50 hours with steam and gaseous ammonia.

2. A process as claimed in claim 1, wherein the tin is dissolved in about 20 to 30% by weight nitric acid.

3. A process as claimed in claim 1, wherein the aqueous colloidal silicic acid solution contains about 15% by weight $SiO_2$.

4. A process as claimed in claim 1, wherein the aqueous colloidal silicic acid solution contains ammonium vanadate and phosphoric acid ($H_3PO_4$).

5. A process as claimed in claim 1, wherein the suspension is treated for about 1 hour with aqueous ammonia.

6. A process as claimed in claim 1, wherein the aqueous catalyst is dried by being atomized.

7. A process as claimed in claim 1, wherein the catalyst is calcined at a temperature of 500 to 650° C.

8. A process as claimed in claim 1, wherein the calcined catalyst is treated for a period of time of about 5 to 10 hours with steam and gaseous ammonia.

9. A process as claimed in claim 1, wherein the calcined catalyst is treated with steam and gaseous ammonia in admixture with air.

10. A process as claimed in claim 1, wherein about 4.5 gram atoms tin and 0 to 5 gram atoms phosphorus in the form of sirupy phosphoric acid are used per gram atom vanadium which is present as ammonium vanadate.

11. A process as claimed in claim 10, wherein about 1 to 3 gram atoms phosphorus are used per gram atom vanadium.

12. A process as claimed in claim 1, wherein 1 to 2 gram atoms of at least one substance selected from the group consisting of barium, aluminum, titanium, tungsten, antimony, chromium and lead salts are used per gram atom vanadium which is used in the form of vanadium vanadate.

13. A process as claimed in claim 12, wherein the salt is a substance selected from the group consisting of the nitrates and acetates.

14. A process as claimed in claim 1, wherein the finished catalyst contains about 50 to 90% by weight $SiO_2$ as a carrier.

15. A process as claimed in claim 1, wherein the catalyst has a specific surface area of about 50 to 500 square meters per gram.

16. A process as claimed in claim 15, wherein the catalyst has a specific surface area of about 300 to 400 square meters per gram.

17. A process as claimed in claim 1, wherein very pure silicon dioxide containing less than 0.05% Na and less than 0.01% K and prepared from water glass is used.

No references cited.

BENJAMIN HENKIN, *Primary Examiner*.
R. DAVIDSON, *Assistant Examiner*.